Aug. 4, 1925.
J. J. N. VAN HAMERSVELD
1,548,227
CHUCK
Filed Oct. 17, 1921
4 Sheets-Sheet 1
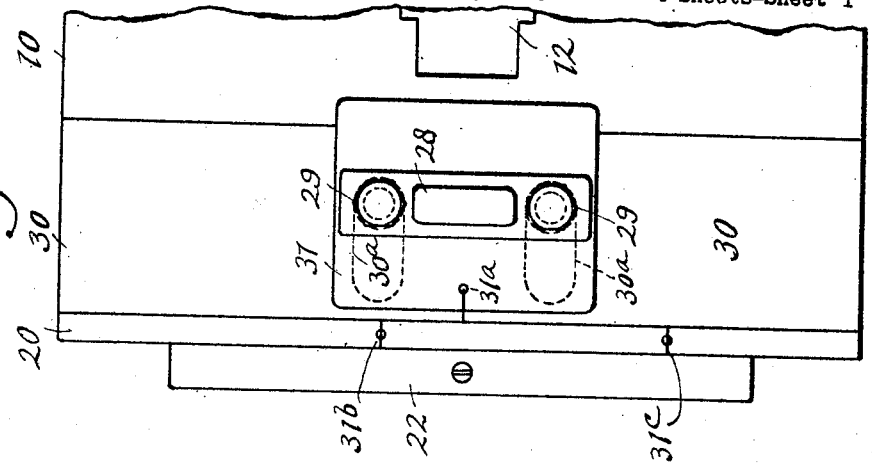
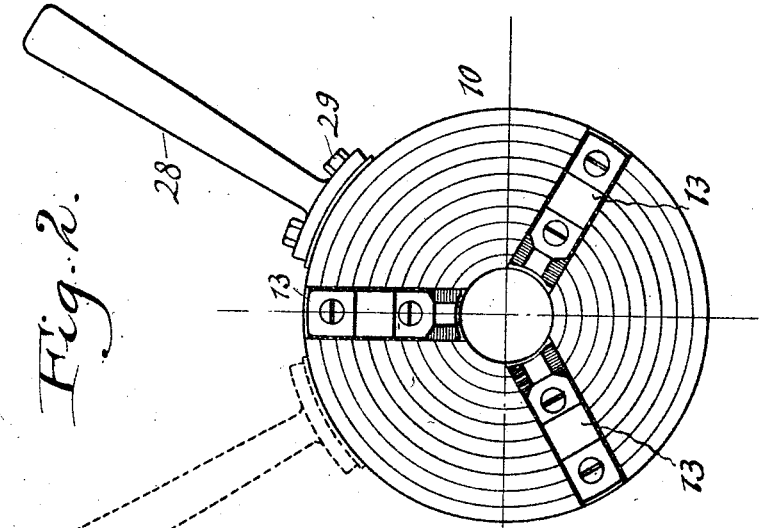
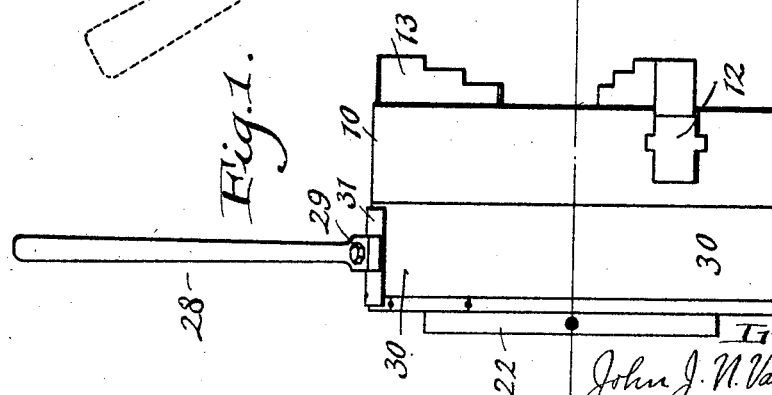
Inventor:
John J. N. Van Hamersveld
Thurston Kwis & Hudson
attys Aug. 4, 1925.
J. J. N. VAN HAMERSVELD
1,548,227
CHUCK
Filed Oct. 17, 1921  4 Sheets-Sheet 2
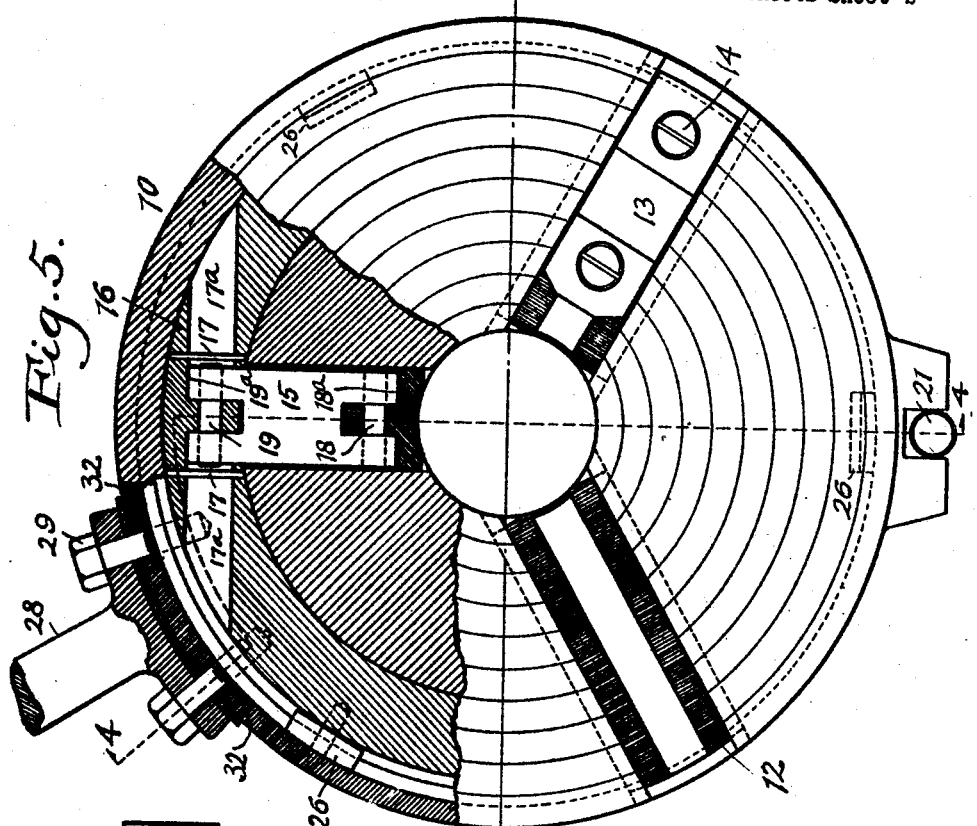
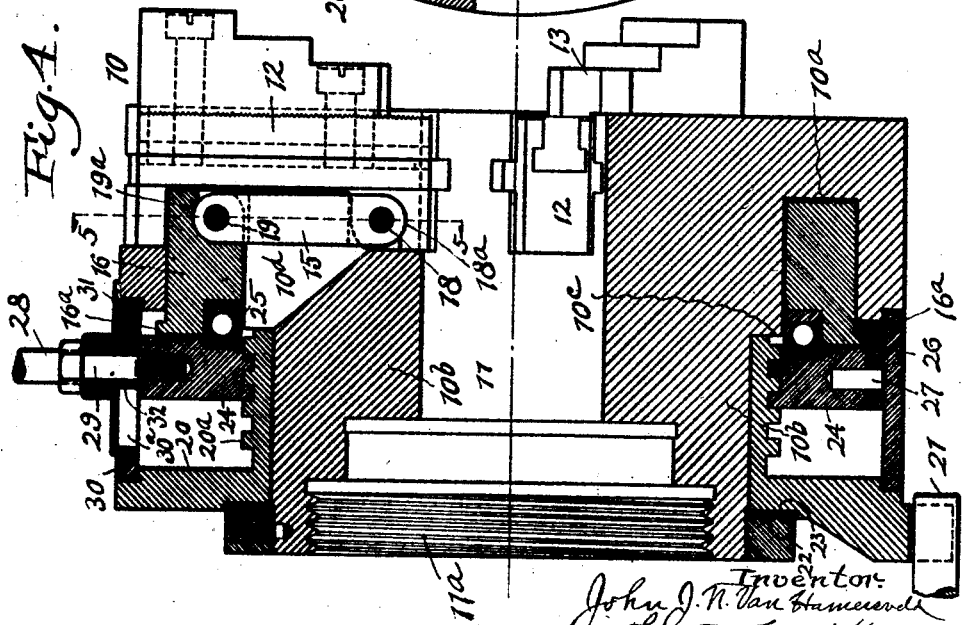
Inventor:
John J. N. Van Hamersveld
Thurston Rivers & Hudson
attys Aug. 4, 1925.
J. J. N. VAN HAMERSVELD
1,548,227
CHUCK
Filed Oct. 17, 1921    4 Sheets-Sheet 3
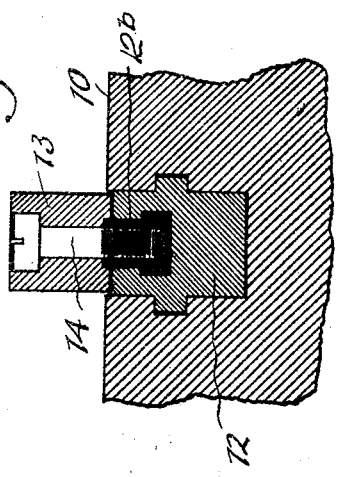
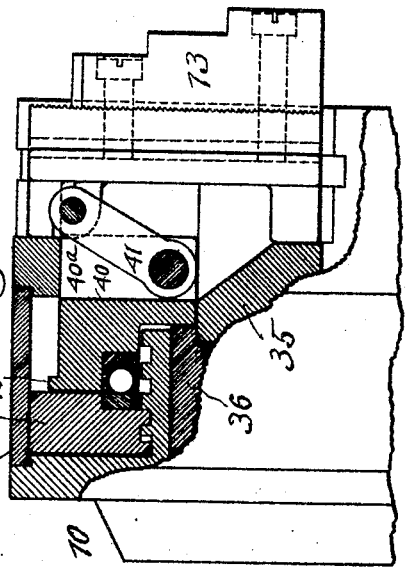
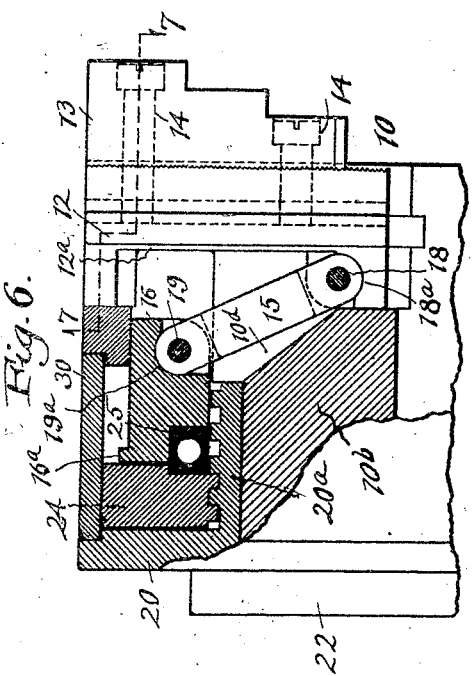
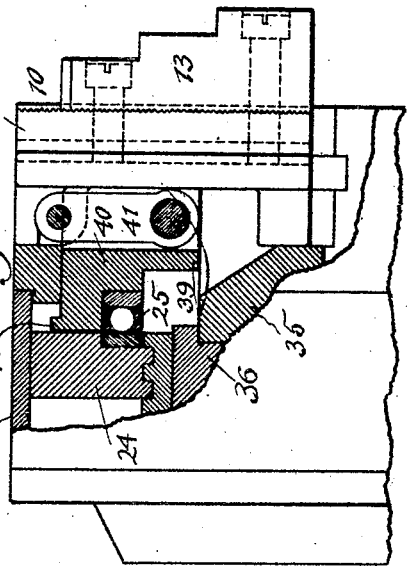
Inventor:
John J. N. Van Hamersveld,
Thurston Kwatt Hadson
attys.

Aug. 4, 1925.
J. J. N. VAN HAMERSVELD
1,548,227
CHUCK
Filed Oct. 17, 1921
4 Sheets-Sheet 4
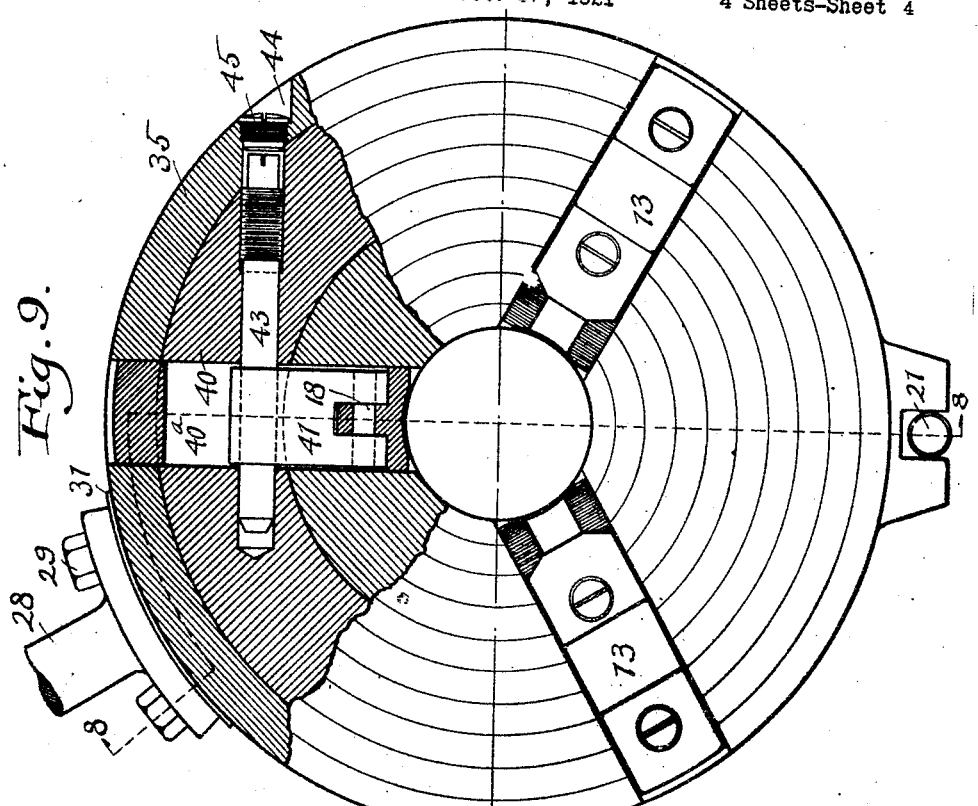
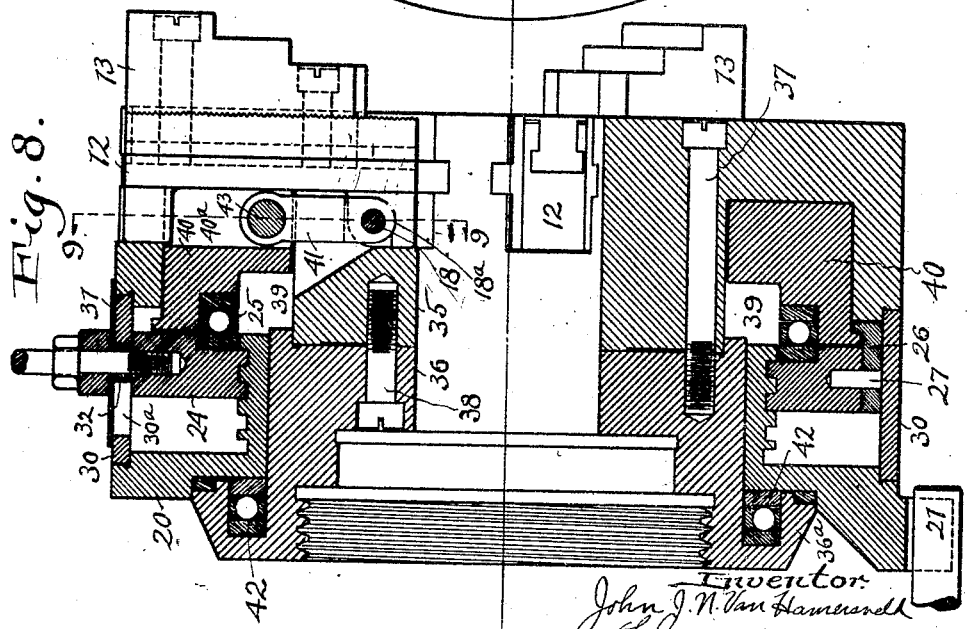

Patented Aug. 4, 1925.

1,548,227

UNITED STATES PATENT OFFICE.

JOHN J. N. VAN HAMERSVELD, OF CLEVELAND, OHIO, ASSIGNOR TO THE WARNER AND SWASEY COMPANY, OF CLEVELAND, OHIO, A CORPORATION OF OHIO.

CHUCK.

Application filed October 17, 1921. Serial No. 508,108.

*To all whom it may concern:*

Be it known that I, JOHN J. N. VAN HAMERSVELD, a citizen of the United States, residing at Cleveland, in the county of Cuyahoga and State of Ohio, have invented a certain new and useful Improvement in Chucks, of which the following is a full, clear, and exact description.

This invention relates to chucks for use on lathes and like machine tools.

More particularly the invention relates to certain improvements in the means for operating the work holding jaws, the object of the invention being to provide a chuck having a powerful gripping action on the work, and which embodies to a high degree the features of strength, maintenance of permanent accuracy, simplicity of construction, reduction in number of parts, and reduced cost of construction.

Further the invention aims to provide a chuck wherein a heavy gripping pressure is secured with a jaw operating mechanism having a small number of rotating parts actuated by a short-stroke hand lever resulting not only in simplicity of construction but also in long life and durability.

Further the invention aims to provide a chuck which is capable of more extensive use than the majority of chucks of this type now on the market in its adaptability to a greater range of work including so-called "first operation work" which requires greater jaw slide travel with a more powerful gripping, and by the avoidance in its construction of parts susceptible of a springing action.

A still further object is to provide a chuck having powerful jaw actuating means adaptable for internal as well as external work gripping.

Other objects of advantage will appear from the following detailed description.

The chief feature of my improved chuck resides in the use of a toggle action instead of screws, spiral groove and cam scrolls, trunnion levers and the like for transmitting power between the actuating member and the work holding jaws.

The invention may be further briefly summarized as consisting in certain novel details of construction, and combinations and arrangements of parts which will be described in the specification and pointed out in the appended claims.

In the accompanying sheets of drawings wherein I have shown the preferred embodiment of the invention, Fig. 1 is a side view and Fig. 2 is a front face view of my improved chuck; Fig. 3 is a top plan view on a slightly enlarged scale looking down on the actuating lever; Fig. 4 is a sectional view through the chuck substantially along the irregular line 4—4 of Fig. 5 looking in the direction indicated by the arrows; Fig. 5 is a view showing the chuck partly in front elevation and partly in section along the line 5—5 of Fig. 4, looking in the direction indicated by the arrows; Fig. 6 is a view corresponding to the upper part of Fig. 4, showing the mechanism when the jaws are in retracted or work releasing position; Fig. 7 is a sectional view substantially along the line 7—7 of Fig. 6, looking in the direction indicated by the arrows; Figs. 8 and 9 are views corresponding to Figs. 4 and 5 and showing a modification in the construction whereby internal as well as external gripping is permissible, these views showing the toggle links and the jaws in position for external gripping; Fig. 8 being a section substantially along the irregular line 8—8 of Fig. 9 and Fig. 9 being in part in section substantially along the line 9—9 of Fig. 8; Figs. 10 and 11 are fragmentary sectional views corresponding to the upper part of Fig. 8, showing one of the toggle links and associated jaw arranged for internal gripping, Fig. 10 showing the parts in gripping position, and Fig. 11 in released position.

Referring first to Figs. 1 to 7, 10 represents a chuck body having a central opening 11, a portion 11$^a$ of which is threaded to fit the spindle of a lathe or other machine tool. It is to be understood, of course, that if desired, so-called adapters may be used between the chuck body and lathe spindle, in which event the adapters will be fitted into, or to the chuck body and screwed onto the spindle to adapt the chuck to spindles of various sizes, in the well-known manner. The chuck body has a rearwardly facing slot or groove 10$^a$ within and to the rear of which is a hub portion 10$^b$, the part of the hub portion within the slot 10$^a$ being of a slightly greater diameter than the part at the rear thereof.

On the front of the chuck body there are a number of radially arranged slots in which jaw-slides 12 are slidably mounted, each slide having a T-slot (see Fig. 7) and on opposite sides thereof serrated surfaces to accommodate the work holding jaws 13 adapted to be secured to the slides by a T-piece 12$^b$ and by screws 14 in the usual manner.

The slides 12 are provided on their rear sides and between their upper and lower ends with notched or cut away portions 12$^a$ (see particularly Fig. 6) to accommodate the swinging movement of jaw operating toggle links 15 and to accommodate also the axial movement of a slide ring 16 which actuates these toggle links and is adapted to slide with an axial movement with reference thereto on an annular surface of the chuck body in the groove 10$^a$ thereof, from the position shown in Fig. 4 to the position shown in Fig. 6. The slide ring is prevented from rotating with reference to the chuck body by being connected to the toggle links 15 which are in turn connected to the jaw slides 12. The chuck body 10 is notched or cut away opposite each of the jaw slides 12 as shown at 10$^d$ to accommodate the swinging movement of the toggle links 15, as will be clearly seen by reference to Figs. 4 and 6, the construction being such that when the slide ring 16 is in its full forward position the toggle links 15 are radial and lie within the recessed or notched portions 12$^a$ of the jaw slides, and when the slide ring is retracted to the position shown in Fig. 6, the toggle links are swung rearwardly within the cut away portions 10$^d$ of the chuck body.

The toggle links 15 are forked or bifurcated at both ends, and their lower ends are connected by pins 18 to upstanding tongues on the inner portions of the jaw-slides, and their upper or outer ends are connected by pins 19 to downwardly extending tongues of the slide ring 16, the forked ends of the toggle links straddling the tongues as will be seen by reference to Fig. 5. On opposite sides of the tongues of the jaw-slides and ring 16, rounded seats 18$^a$ and 19$^a$ are provided which receive the rounded forked ends of the toggle links as shown in Figs. 4, 5 and 6. These seats take the thrust between the toggle links, the jaw-slides and the slide ring when the jaws grip the work piece, the pins 18 and 19 serving simply to hold the toggle links in place, and to return the jaw-slides by the backward movement of the slide ring. The pins 17 on the slide ring serve to prevent the pins 19 from getting out of place, which pins 17 extend across openings 17$^a$ which are provided for machining purposes and also to permit insertion and removal of the pins 19, as is clear from Fig. 5.

For the purpose of moving the slide ring 16 axially, and of swinging the toggle links toward and from their vertical or radial position so as to cause the powerful clamping action which ensues, the following mechanism is provided. On the rear part of the hub of the chuck body a stationary sleeve 20 is provided, which may be held stationary by any suitable means such as a pin 21 so that the hub of the chuck body may rotate with reference to it. This sleeve has an externally threaded hub portion 20$^a$ which is held between a shoulder 10$^c$ on the hub 10$^b$ of the chuck body, and a holding ring 22 which is screwed and locked onto the extreme rear end of the hub 10$^b$. Between the sleeve 20 and the holding ring 22 any suitable form of thrust bearing may be provided, which is shown in Figs. 4 and 6 in the form of a floating washer 23 embedded in the rear face of the sleeve 20, which washer may be of brass. However, an annular ball bearing 42 may be used in place of the washer 23 as illustrated in the modification shown in Fig. 8.

The threaded hub 20$^a$ of the stationary ring 20 is engaged by a nut ring 24 which is adapted to be turned back and forth so as to have an axial movement along the hub 20$^a$ of the stationary ring sufficient to move the slide ring 16 from one extreme position to the other. When the nut ring is moved forwardly it transmits its forward motion to the slide ring so as to straighten the toggle links, and this is done through the medium of an annular ball bearing 25. On the other hand, when the nut ring is moved rearwardly, the slide ring is caused to move rearwardly with it by means of a series of clips or fingers 26 which are secured by pins 27 (see particularly the bottom of Fig. 4) in slots or notches in the periphery of the nut ring 24, and are provided at their forward ends with inturned lips which engage over an annular flange 16$^a$ at the outer rear end of the slide ring 16. Thus the slide ring and nut ring 24 move forwardly and rearwardly together as far as axial movement is concerned, and at the same time the slide ring may rotate relative to the nut ring and the thrust between the slide and nut ring is taken by the ball bearing 25.

The jaws may be moved from released to gripping position or from gripping to released position when the chuck is rotating, as well as when it is stationary. For the purpose of turning the nut ring on the hub of the stationary sleeve 20 so as to give it the necessary axial movement to operate the jaws of the chuck, an actuating lever 28 is provided, the throw of which is indicated in Fig. 2, wherein the lever is shown by full and dotted lines in two positions which represent its extreme positions, which correspond to the positions of the parts shown in Figs. 4 and 6 respectively. This actuating lever 28 has a flanged lower end which is secured by screws 29 to the nut ring 24.

These screws 29 pass through elongated slots 30ª of a cover sleeve 30 (for the slots 30ª see Figs. 3 and 4) which sleeve is mounted between the outer part of the stationary sleeve 20 and the outer portion of the chuck body forwardly thereof so as to cover the nut ring 24, the slide ring 16 and the threaded portion of the stationary ring 20. Thus when the lever 28 is swung or turned, the cover sleeve 30 and nut ring 24 turn with it, and at the same time the screws 29 travel lengthwise of the slots 30ª of the cover sleeve. The base of the actuating lever and the screws 29 hold in position a shield 31, there being beneath the shield and surrounding the screws in the slots 30ª, bushing-like spacers 32. This shield follows the movement of the actuating lever as it is turned, and at the same time is given a slight axial movement corresponding with the axial movement of the nut ring 24, and at all times covers the slots 30ª. As the positions of the jaws are indicated by the positions of the actuating lever, and as the first part of the travel of said jaws is a quick advance, and the gripping of the work may take place during the second part of their travel, the shield 31 following the movement of the actuating lever serves also an additional function akin to that of an indicator, as it is preferably provided with a zero marked groove 31ª on its rear end, which after the quick advance of the jaws registers with a groove 31ᵇ on the adjacent portion of the stationary ring 20 indicating the point where the jaws may begin to grip, and when it has reached the other groove 31ᶜ on the ring 20, the maximum gripping point of the jaws has been reached.

It will be seen therefore, that as the lever 28 is swung, the nut ring 24 is moved axially, and its axial movement is transmitted to the slide ring 16, causing the toggle links to be moved toward or from their upright or radial position, and causing an inward or outward movement of the jaws 13. Likewise, it will be seen that as the toggle links are moved toward the vertical or radial position, the toggle action produces an extremely powerful gripping action between the jaws and the work, which gripping constantly increases until the vertical position of the links is reached. Inasmuch as the toggle links when in action are under compression only, and are not subjected to a bending action, the gripping power is not limited by spring of any of the parts, as is the case with most chucks on the market at the present time. Furthermore, the construction is such that the toggle links occupy little room circumferentially considered, and therefore the construction is well adapted for any desired number of jaws. While I have here shown three jaws, I do not desire to be confined to this number.

On account of the toggle action, as the jaws are moved to gripping position the speed of radial movement of the jaws decreases constantly compared with the speed of travel of the actuating lever and of the slide rings 16, and on this account there is a quick advance of the jaws at the start and during the first part of the movement, and a powerful and increasing grip on the work during the remainder of the movement.

Finally it might be stated that it is not essential that the toggle links be perpendicular to the axis of the chuck to transmit a powerful holding action to the jaw-slides. On the other hand, when they are in a position somewhat off from the perpendicular position, the thrust is chiefly radial, and any thrust in a direction endwise of the chuck is amply taken care of by the nut ring which is connected to the stationary sleeve 20 by the screw threads which are self locking. In fact, when the toggle links are within substantially ten degrees of the perpendicular position, the thrust may be regarded as radial, and there is substantially no thrust on the slide ring 16 in an axial direction.

In Figs. 8, 9, 10 and 11 I have shown a chuck having the same principle of operation as that first described, but modified slightly so as to admit of a reversal of the jaw-slide and toggle links so as to adapt the chuck for internal gripping as well as external gripping.

In the modified construction illustrated in the figures referred to, the chuck body is formed of two parts 35 and 36 secured together by screws 37 and 38. The front part 35 of the chuck body is, as in the first instance, slotted to receive the jaw-slides 12 which carry the jaws 13 similar to those of the first described construction. Further this front member of the chuck body has a rearwardly facing groove or recess 39 which receives the slide ring here designated 40 which is connected by toggle links 41 to the jaw-slides 12. The construction and arrangement of the remaining parts of the chuck are substantially like those first described, there being between the slide ring and the nut ring 24 the ball bearing 25, the latter having the clips or fingers 26 as in the first instance. The nut ring 24 is adapted to be turned by the actuating lever 28, and is engaged with the threaded hub of the stationary sleeve 20, which is mounted on the rear part 36 of the chuck body. The actuating lever 28, as in the first instance, extends through the cover sleeve 30, which in this case is mounted on the outwardly extending portion of the stationary ring 20 and the outer portion of the forward part 35 of the chuck body, as clearly shown in Fig. 8. In this case the rearward thrust of the stationary sleeve 20 is resisted by an annular ball bearing 42 instead of the brass washer or ring 23 of the first described construction, this ball bearing being between the stationary sleeve 20 and a recessed extension 36ª at the rear part of the rear member 36 of the chuck body.

The hub of the front part 35 of the chuck body is of somewhat reduced diameter with respect to the hub of the rear member of the chuck body, this being provided in order to admit the use of a slide ring 40 which in this instance extends inwardly somewhat further than the slide ring 16 of the first described construction, and in order to admit of the use of toggle links 41 somewhat shorter than the toggle links 15 of the first construction.

In this instance the front of the slide ring 40 is provided with slots 40ª to accommodate the toggle links 41, which slots extend across the full front face of the slide ring, and in this instance the rounded seats 19ª of the first construction are omitted, and the toggle links are connected to the slide ring 40 by screws 43 which are heavier than the pins 19 of the first construction, so that they may take the thrust between the slide ring and toggle links. The other ends of the toggle links are connected to the jaw-slides by the pins 18, as in the first construction, the jaw slides having the thrust receiving seats 18ª which accommodate the rounded ends of the toggle links. Openings 44 (see Fig. 9) are provided in the slide ring and member 35 of the chuck body, which openings are in line with the screws 43, and normally closed by screw plugs 45. When the screw plugs 45 are removed, the screws 43 can be removed so as to disconnect the toggle links 41 from the slide ring 40.

With the parts arranged as in Fig. 8, the chuck is adapted for external gripping as in the first instance, the action being precisely the same as that first described. To adapt the chuck for internal gripping, it is only necessary to remove the screws 43 so as to disconnect the links from the slide ring, remove the jaw slides, and reverse their position in the slots of the chuck body and then reconnect the toggle links and the slide ring so that the toggle links now extend outwardly from the pins 43 as illustrated in Figs. 10 and 11. It will be seen that with the parts arranged as shown in Figs. 10 and 11, when the slide ring is moved forwardly the toggle links are straightened, but when this occurs, the jaw slides are moved outwardly and a toggle action for internal gripping identical with that obtained for external gripping is secured.

This modified chuck possesses all the advantages of the chuck first described, and the additional advantage that it is adapted for internal gripping as well as external, and as the construction embodies the same principle of operation, so far as the actuation of the jaw-slides is concerned, as that first described at considerable length, further description of the operation is thought to be unnecessary.

I do not desire to be confined to the exact details shown, as modifications may be made in the details of construction and arrangement, and I aim in my claims to cover all modifications which do not involve a departure from the spirit and scope of my invention as set forth in the appended claims.

Having described my invention, I claim:

1. In a chuck, a rotary chuck body, work gripping jaws movable inwardly and outwardly with respect to the longitudinal axis of the chuck body, means for actuating the jaws comprising axially movable means carried by the chuck body, toggle members between the same and the jaws, a fixed annular member having a direct bearing on the rotary chuck body, and a normally stationary rotary adjustable member mounted on said fixed annular member for actuating said axially movable means while the chuck body is stationary or rotating.

2. In a chuck, a rotary chuck body, work gripping jaws movable inwardly and outwardly with respect to the longitudinal axis of the chuck body, means for actuating the jaws comprising axially movable means carried by the chuck body and having an operative connection with the jaws so that axial movement thereof causes an in or out movement of the jaws, a fixed annular member having a direct bearing on the rotary chuck body, and a normally stationary rotary adjustable member mounted on said fixed annular member for actuating said axially movable means while the chuck body is stationary or rotating.

3. In a chuck, a rotary chuck body having work gripping jaws supported at the front portion thereof and movable inwardly and outwardly with respect to the longitudinal axis of the chuck body, and said chuck body having an annular bearing surface rearwardly of the jaws and forwardly of the rear end of the body, means for actuating the jaws comprising a fixed member supported on said annular bearing surface of the chuck body, a normally stationary rotary adjustable member supported on said stationary member, and axially movable means between said adjustable member and the jaws and operatively connected to the latter so that when the said means is moved axially the jaws are moved inwardly or outwardly.

4. In a chuck, a rotary chuck body having work gripping jaws at the front thereof and provided rearwardly of the jaws and forwardly of the rear end thereof with an annular bearing surface, a stationary member having a bearing on said surface, a normally stationary adjustable member mounted on and having a screw connection with said stationary member whereby it will have an axial movement when turned, means between said adjustable member and the jaws for causing the axial movement of the former to cause an inward or outward movement of the jaws, and a thrust bearing at the rear end of the chuck body for said stationary member.

5. In a chuck, a rotatable chuck body having a relatively large front portion and rearwardly thereof a relatively reduced annular portion, jaws movable inwardly and outwardly across the front of the enlarged portion, a stationary member having a direct bearing on said annular portion of the chuck body, a normally stationary but rotatable annular member mounted on and having a screw connection with said stationary member whereby it will move axially when turned, the relatively large front portion of the chuck body having a rearwardly facing channel, and an axially movable annular member in said channel, said member having a toggle link connection with the jaws, and having a connection with said normally stationary adjustable annular member.

6. In a chuck, a rotatable chuck body having jaws movable inwardly and outwardly at the front thereof and having a reduced portion at the rear of the jaws provided with an annular bearing surface, a stationary member having a direct support on said bearing surface and located forwardly of the rear end of the chuck body, an annular normally stationary but adjustable member mounted on said stationary member and having a screw connection therewith whereby it will move axially when turned, axially movable means carried by the chuck body and connected with said adjustable member so as to partake of the axial movement thereof, and means connecting said axially movable member with the jaws so as to impart inward and outward movement thereto and being reversible so as to be capable of transmitting a gripping thrust for either inward or outward gripping.

7. In a chuck, a rotatable chuck body having jaws movable inwardly and outwardly across the front thereof, and provided rearwardly of the jaws with a reduced portion having an annular bearing surface, a stationary member supported on said surface and located forwardly of the rear end of the chuck body, an adjustable member mounted on and having a screw connection with a forward extension of said stationary member whereby it has an axial movement when turned, an annular axially movable member forwardly of said adjustable member and having an operative connection therewith so as to partake of the axial movement of the adjustable member, movement imparting means between said axially movable member and the jaws, and an annular guard surrounding said adjustable member and extending from a portion of said chuck body to the outer rear portion of the stationary member.

In testimony whereof, I hereunto affix my signature.

JOHN J. N. VAN HAMERSVELD.